Oct. 23, 1923.
S. W. BOURN
1,471,587
METHOD OF FORMING OUTSOLES FOR RUBBER FOOTWEAR
Filed July 5, 1919
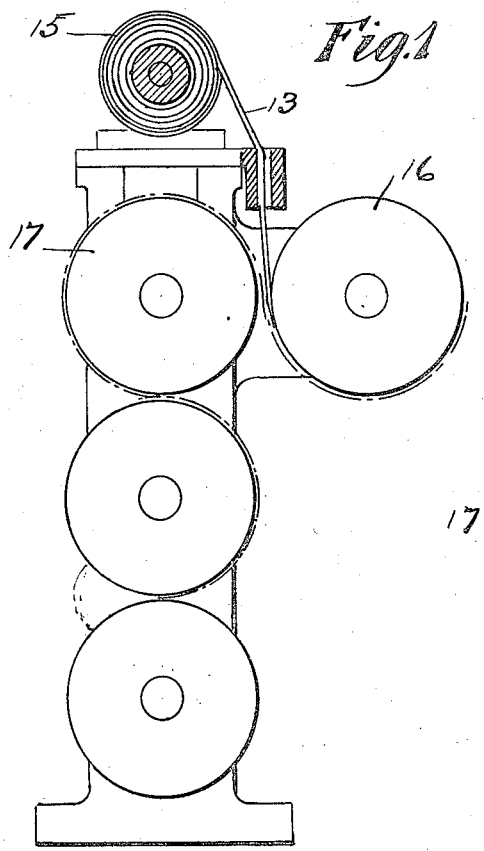
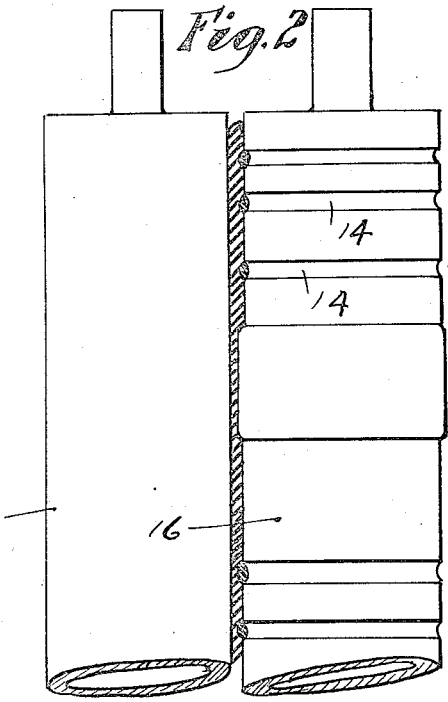
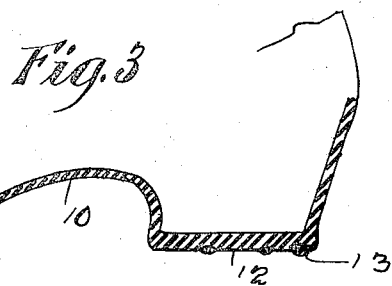
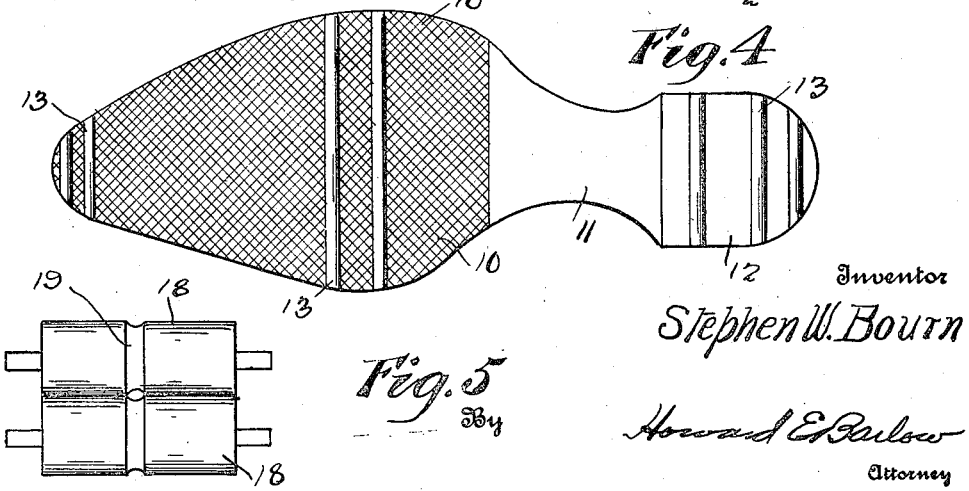
Inventor
Stephen W. Bourn
By
Howard E. Barlow
Attorney Patented Oct. 23, 1923.

1,471,587

UNITED STATES PATENT OFFICE.

STEPHEN W. BOURN, OF PROVIDENCE, RHODE ISLAND.

METHOD OF FORMING OUTSOLES FOR RUBBER FOOTWEAR.

Application filed July 5, 1919. Serial No. 308,688.

*To all whom it may concern:*

Be it known that I, STEPHEN W. BOURN, a citizen of the United States, and resident of the city of Providence, in the county of Providence and State of Rhode Island, have invented certain new and useful Improvements in Methods of Forming Outsoles for Rubber Footwear, of which the following is a specification.

This invention relates to an improvement in rubber outsoles and the method of constructing the same, and has for its object to provide such a method of forming such an outsole, which consists in imbedding, or partially imbedding, one or more narrow strips or cords of material of a different color, character, or wearing quality, into the wearing surface of a sheet of rubber or rubber-compound and to subsequently cut the sheet into outsoles in such a manner that a portion of said strip or strips is exposed in those portions of the outsoles which receive the greatest wear, thus materially increasing the wearing life of the outsole.

With these and other objects in view, the invention consists of certain novel features of construction, as will be more fully described, and particularly pointed out in the appended claims:

In the accompanying drawings:

Figure 1— is a side elevation showing the rolls of a calender; and also illustrating the strip or strips of material as being fed to the wearing surface of a sheet of rubber compound while passing through the calender rolls.

Figure 2— is a top view of the calender rolls, showing a plurality of strips as being fed to the sheet of rubber compound while passing between the rolls.

Figure 3— is a sectional edge view illustrating a plurality of strips or cords as imbedded into those portions of the outer surface of the outsole, which receive the greatest wear.

Figure 4— is a plan view of the wearing surface of the outsole with the strips or cords imbedded therein.

Figure 5— is a detail showing a pair of grooved rolls for forming the strips or cords which are inserted into the wearing surface of the outsole.

In practice the wearing life of a rubber shoe is practically limited to the resisting quality of the heel-portion as this portion is called upon to receive the greater percentage of the wear. In the making of rubber shoes, it is greatly to be desired in order to lend beauty and graceful lines to the shoe, to form the whole out-sole including the heel, shank and ball-portion, entirely of one piece of material. To do this the ball 10, the shank 11 and the heel 12 have heretofore been made of a good quality of stock in order that the heel-portion which receives the greatest wear, shall last for a reasonable length of time. Therefore it will be seen that the rest of the outsole such as the shank and the ball portion which are not subjected to such severe wear, have been made of a grade better than is necessary, and the cost of the shoe is consequently increased without producing the desired result. To obviate this difficulty I have provided a strip of material 13 which may be made of rubber compound, fiber, mixture of rubber compound and fiber, or some other suitable material of a different or better wearing quality than that of the outsole, and I have provided means whereby one or any desired number of such strips may be fed from a reel 15 or other suitable supply to the sheet of rubber compound preferably while passing through the calender rolls, and preferably at a point between the rear top roll 17 and the engraved faced roll 16, which latter is preferably grooved or scored as at 14 to receive and guide the strip or strips and cause them to lie in the direction of travel of the sheet through such rolls, said strip or strips being imbedded or partially imbedded into the wearing surface of the sheet leaving a portion of the strip exposed and raised above the adjacent surface of the outsole.

After the sheets have been formed and the strips imbedded therein by action of the calender or by other suitable means, these sheets are cut into outsoles preferably in such a manner that said strips lie transversely of the outsole or heel or they may be arranged in any other desired position, a portion of the body of the strip remaining above the normal wearing surface of the outsole whereby these strips which possess a high-wearing quality are caused to receive a large percentage of the wear which would otherwise be taken by the cheaper grade of rubber of the outsole.

I do not wish to be restricted to the use of a single strip or cord in the wearing surface of the outsole as any number of these strips may be employed. In some cases the strips or cords are applied exclusively to the heel-portion of the outsole while in still other cases these strips or cords are applied also to both the ball and the toe of the outsole.

By my improved construction it will be seen that the outsole of a cheaper quality may be employed and yet by the insertion of these strips of a better quality at the points where the greatest wear is received the wearing quality or life of the whole is greatly increased. Then again by setting these strips or cords transversely of the outsole they are adapted to perform somewhat the function of a creeper to obtain a firmer foothold and so prevent the wearer from slipping when the walking is bad.

These strips may be made in any shape but I preferably make them in the form of a narrow strip or cord, approximately circular or oval in cross section. In some cases I also make these strips of a color different from the rest of the outsole in order to give to the goods a distinct and attractive appearance.

These cords are preferably formed separate and independent from the rest of the outsole by passing a strip of the material from which they are made through a set of rolls 18 grooved at 19 as shown in Figure 5, or they may be produced by any other suitable means and subsequently applied to the outsole in any desired way.

Having thus described one illustrative embodiment of my invention and the best mode known to me for carrying out my method, I desire it to be understood that although specific terms are employed, they are used in a generic and descriptive sense and not for the purpose of limitation, the scope of the invention being defined and limited only by the terms of the appended claims.

I claim:

1. The method of forming sheet stock for outsoles of rubber footwear which consists of partially imbedding a narrow strip of material of the finished width into the wearing surface of a sheet of rubber during its passage through the calender rolls.

2. The method of forming sheet stock from which the outsoles for rubber footwear are made which consists in imbedding a narrow strip of material of its final size of a wearing quality different from that of said sheet into the wearing surface of a sheet of rubber compound by action of calender rolls.

3. The method of forming stock for outsoles for rubber footwear which consists in partially imbedding a narrow strip of material of its final width into the wearing surface of a sheet of rubber compound said strip being of a character different from that of said sheet, and a portion of said strip being set on a plane above that of the normal wearing surface of the sheet.

4. The method of forming sheet stock for outsoles for rubber footwear consisting in feeding a plurality of spaced apart continuous narrow strips of material of finished width to the sheet of rubber compound while passing through calender rolls to be partially imbedded into the wearing surface of said sheet by action of said rolls, said strips being of a color different from that of the outsole.

5. A method of forming stock for outsoles, which consists in providing a plurality of strips of material of a quality different from that of the wearing surface of the outsole material, arranging said strips in spaced apart relation and imbedding the entire width of said strips into the wearing surface of the outsole material.

6. The method of forming sheet stock for outsoles for rubber footwear consisting in feeding a plurality of spaced apart continuous narrow strips of material of the final width to the sheet of rubber compound while passing through calender rolls to be partially imbedded into the wearing surface of said sheet by action of said rolls, said strips being of a character different from that of the body of the stock and subsequently cutting the prepared sheet into outsoles.

In testimony whereof I affix my signature in presence of a witness.

STEPHEN W. BOURN.

Witness:
    HOWARD E. BARLOW.